March 12, 1929. O. L. HENDRIKSON 1,704,894
ADJUSTABLE VISOR
Filed May 12, 1928
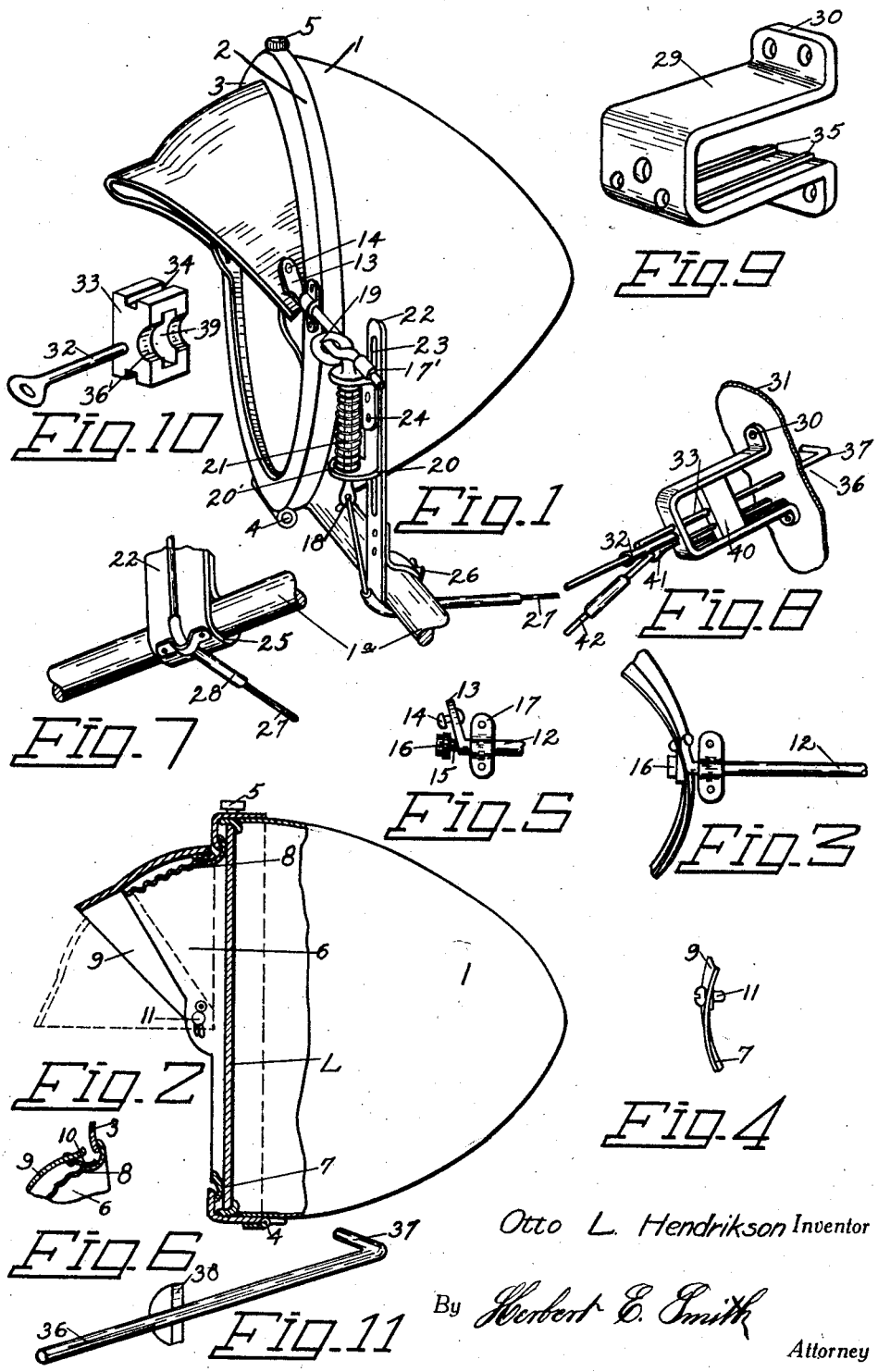
Otto L. Hendrikson Inventor
By Herbert E. Smith
Attorney

Patented Mar. 12, 1929.

1,704,894

UNITED STATES PATENT OFFICE.

OTTO L. HENDRIKSON, OF SPOKANE, WASHINGTON.

ADJUSTABLE VISOR.

Application filed May 12, 1928. Serial No. 277,221.

My present invention relates to improvements in adjustable visors for headlights of automotive vehicles and preferably used upon automobiles. The primary object of the invention is the provision of means in connection with the headlights for controlling the light rays reflected from the reflectors of the headlights, especially for the purpose of preventing the light rays from dazzling the eyes of the driver of an approaching automobile, and for directing the light rays in desired position upon the roadway. In carrying out my invention I equip each headlight with a stationary hood and an adjustable visor and provide means whereby the adjustable visor may be moved relatively to the hood and headlight for the purpose of controlling the distribution of the light rays from the headlight. Manually operated means are employed for adjusting the visor, and the two visors of the headlights may selectively be adjusted by the manual control, either together, or separately and independently as desired.

The invention consists in certain novel combinations and arrangements of parts involving the adjustable visors and the manually controlled operating means for the visors as will hereinafter be more fully set forth and claimed.

In the accompanying drawings I have illustrated one complete example of the physical embodiment of my invention in connection with a single headlight, but it will be understood, of course, that the invention contemplates the use of two headlights. The drawings also show the means for operating two visors, and in the drawings I have shown the best mode I have so far devised for the practical application of the principles of my invention.

Figure 1 is a perspective view of the right hand headlight of an automobile equipped with the device of my invention. Figure 2 is a vertical sectional view showing the relative positions of the hood and visor. Figure 3 is a detail view looking from the front of the headlight, showing the crank shaft and its connection to the visor. Figure 4 is a detail view from the front showing one of the trunnions between the hood and visor. Figure 5 is a detail view showing the inner end of the crank shaft with its parts that connect with the visor and hood. Figure 6 is a detail sectional view showing an anti-rattling spring or latch cooperating with the hood and visor. Figure 7 is a perspective detail view showing the guide sleeve or sheath for one of the pull cables. Figure 8 is a detail perspective view showing the actuating devices for the two headlights. Figure 9 is a perspective view of the housing for the actuating devices. Figure 10 is a perspective view of a portion of the actuating device. Figure 11 is a perspective view of the actuating rod or pull rod of the device.

In the drawings I have shown one headlight which is indicated by the numeral 1 and of conventional form. The headlights as usual are supported at the front of the automotive vehicle on the cross rod or bar 1ª and of course the lights are spaced apart in customary manner. The device of my invention is applied to the headlight by the use of a bezel 2 which has a retaining flange 3 and is hinged at 4 at the under side of the front of the headlight. This bezel is adapted to swing on the hinge and fits over the front edge of the headlight so that it may be locked in secure position by means of a lock screw or nut 5 at the top of the headlight. The bezel is employed to retain and support a stationary hood 6 which is provided with an annular grooved flange 7 that fits within the annular flange 3 of the bezel, and it will be apparent that after the bezel is clamped in position the hood by its annular flange will be retained in fixed position in front of the lens L of the headlight. The hood 6 extends in an arch over the upper portion of the headlight in front of the lens, and the exterior central portion of the hood is provided with a number of corrugations as 8. The adjustable visor 9 is fashioned to conform to the hood and encloses it as shown in Figure 2. An anti-rattling spring 10 is secured to the inner side of the visor and this spring is adapted to contact with one of the corrugations 8 of the hood to retain the visor in adjusted position and to act as an anti-rattling device between the hood and the visor. At the outer side of the headlight which is the right hand side of the automotive veicle, the visor is pivoted upon a trunnion 11 which trunnion is fixed to the hood 6 and projects laterally therefrom to form a pivot pin or trunnion for the visor 9.

The trunnion 11 is located at one side of the headlight and at the opposite side of the headlight a crank rod 12 is located to form the diametrically arranged pivotal support for the adjustable visor 9 so that the latter may swing as indicated in dotted lines in Figure 2 to adjusted position for the purpose of obscuring the upper portion of the headlight and thus reflect or direct the rays of light directly upward the roadway and out of the vision of the driver of an approaching automobile. This crank rod is fashioned with a lug 13 that is riveted at 14 on the exterior of the visor and the end of the crank rod is fashioned with a trunnion 15 that is rigid with the hood and journaled in the visor, and a head 16 on the trunnion prevents displacement of the latter from the visor. The crank rod is journaled in bearings 17 and 17', the bearing 17 being fixed on the flange 3 of the bezel 2, and the bearing 17' being attached to a slotted plate 22 which will hereinafter be described. The crank rod extends horizontally from the inner side of the headlight and it is turned in its bearings by means of a vertically disposed connecting link 18 which has an eye 19 encircling the crank rod. The connecting link is supported to reciprocate in a bracket 20 having upper and lower flanges that are perforated for the link, and a spring 21 which is coiled about the link 18 is interposed between the lower flange 20' of the bracket and a fixed part of the link in order that the spring may exert its tension to hold the visor in uppermost position and to swing the visor upwardly on its trunnions or pivot pins when the spring is free to do so. The bracket is adjustable upon a fixed plate 22 which is provided with a slot 23 for the screws 24 of the bracket. This plate is located in a vertical plane and the bracket may be adjusted on the slotted plate to bring it to correct operative position for the link 18. The slotted plate 22 is clamped at its lower end on the cross rod 1ª by means of a sleeve 25 and the screw or set bolt 26 passing through the sleeve and impinging against the cross rod.

At the lower end of the connecting link 18 and below its bracket flange 20' a pull cable 27 is attached and as shown in Figure 1 extends downwardly and under the cross rod 1ª and thence passes rearwardly to position where it is accessible to the driver of the car. The pull cable passes through a sheath 28 which bends around under the lower end of the slotted plate 22 and this sheath guides the pull cable from vertical to horizontal position. The cable 27 extends rearwardly to a housing 29 which has flanges 30 that are secured to the foot board or other suitable support 31 where it is accessible to the driver of the car, as seen in Figure 8. A draw bar 32 is passed through an opening in the housing, and within the housing this draw bar is secured to a slide block 33 which has upper and lower grooves 34 that co-act with the complementary ribs 35 at the inner sides of the upper and lower walls of the housing 29. The slide block is adapted to slide forwardly and rearwardly in the housing and is actuated by means of a pull rod 36 which has a handle 37 and extends through the foot board 31 as shown in Figure 8. The pull rod has a semi-circular head 38 fixed thereon which is located at the same side of the rod 36 as the angular handle 37 in order that the location of the locking head 38 may be determined by the position of the handle 37. The pull rod 36 is journaled in bearings 36' of the slide block and the head 38 of the pull rod is designed to co-act with a transversely arranged groove 39 in the face of the slide block.

A second complementary slide block 40 is shown in Figure 8 which is used to actuate the visor on the other headlight of the car and this slide block 40 has a groove similar to 39 for the head 38 and a bearing groove similar to 36' for the pull rod. A draw bar 41 to which the cable 42 is connected is also connected to the slide block 40. The cable 42 is connected with the operating means of the visor on the left hand headlight of the automobile, and it will be understood that the operating means for the visor of the headlight at the left side of the automobile is the same as that shown in Figure 1, but of course arranged in proper positions and location for the purpose. The semi-circular head 38 is retained at all times in the semi-circular grooves of the slide block 33 or of the slide blocks 33 and 40. Thus if the visor of the right hand headlight is to be moved the pull rod 36 will be turned to the position shown in Figure 6. In this position the semi-circular head occupies the semi-circular groove 39 of the slide block 33 and of course a pull on the handle 37 will slide this block. By swinging the handle 37 through an arc of 180 degrees the head 38 may be disengaged from the block 33 and cause to engage the block 40 for the purpose of operating the visor of the headlight at the left side of the machine. By turning the handle 37 in either direction through an arc of 90 degrees from the position in Figure 11, the semi-circular head will be caused to engage both of the slide blocks 33 and 40, and while in such engagement both of the visors on the headlight of the car may be adjusted as desired.

Having thus fully described my invention what I claim as new and desire to secure by Letters Patent is:—

1. The combination with a hood, of a visor pivoted thereon, one of the pivots and the visor including a crank shaft, a stationary support and an adjustable bracket thereon, a spring actuated link supported in the bracket and connected with the crank shaft, means for actuating said link, and means co-acting with the visor and hood for retaining the visor in adjusted position.

2. The combination with a pivoted visor having a crank shaft, of a support and an adjustable bracket thereon a spring actuated link supported in the bracket and connected with the crank shaft, a pull cable connected to said link, and actuating means for said pull cable.

3. The combination with a pair of headlights having pivoted visors and operating means for the visors including pull cables, of a pair of slide blocks each having a draw bar connected to a cable, a pull rod, and means on said rod for selective co-action with either or both of said slide blocks.

In testimony whereof I affix my signature.

OTTO L. HENDRIKSON.